(12) United States Patent
Zaleski

(10) Patent No.: US 8,402,761 B2
(45) Date of Patent: Mar. 26, 2013

(54) STEP-LESS HYDROSTATIC GEAR BOX FOR ROTARY MOVEMENT SLGB

(76) Inventor: Jacek Zaleski, Cologny/Geneva (CH)

( * ) Notice: Subject to any disclaimer, the term of this patent is extended or adjusted under 35 U.S.C. 154(b) by 999 days.

(21) Appl. No.: 12/387,251

(22) Filed: Apr. 29, 2009

(65) Prior Publication Data

US 2010/0186403 A1    Jul. 29, 2010

(30) Foreign Application Priority Data

May 14, 2008    (PL) .......................................... 385179

(51) Int. Cl.
*F16H 39/26*    (2006.01)
(52) U.S. Cl. ....................................... 60/491; 192/58.91
(58) Field of Classification Search .................... 60/490, 60/491; 192/58.91, 58.92, 60
See application file for complete search history.

(56) References Cited

U.S. PATENT DOCUMENTS

| | | | |
|---|---|---|---|
| 1,497,741 A | 6/1924 | Schneider | |
| 2,148,352 A | 2/1939 | Hamblin | |
| 3,135,093 A * | 6/1964 | Hoffman, III | 60/490 |
| 3,740,954 A * | 6/1973 | Young | 60/489 |
| 4,471,669 A * | 9/1984 | Seaberg | 475/24 |
| 4,528,861 A * | 7/1985 | Stubbs | 74/364 |
| 4,545,204 A * | 10/1985 | Whalen | 60/491 |
| 4,922,804 A * | 5/1990 | Goldenberg | 91/532 |
| 5,689,956 A * | 11/1997 | Reboredo | 60/491 |
| 5,799,487 A * | 9/1998 | Valsamis | 60/487 |
| 5,830,097 A | 11/1998 | Larkin | |
| 6,440,026 B1 | 8/2002 | Johnson | |
| 6,830,530 B2 * | 12/2004 | Perkins et al. | 475/231 |

FOREIGN PATENT DOCUMENTS

| | | |
|---|---|---|
| EP | 216540 A1 * | 4/1987 |
| EP | 0300293 A | 1/1989 |
| WO | WO 86/04306 | 7/1986 |
| WO | WO 96/00865 | 1/1996 |
| WO | WO 98/49470 | 11/1998 |

* cited by examiner

*Primary Examiner* — Thomas E Lazo
(74) *Attorney, Agent, or Firm* — Bacon & Thomas, PLLC

(57) ABSTRACT

A hydrostatic system for step less rotary movement transmission having two hydrostatic motors with radial pistons connected in a push-pull configuration, an oil distribution system and a system for elimination of air and other volatile substances from the working spaces. The input of the gear box is connected to the engine and the output is connected to the external load. In this push-pull configuration of both hydrostatic motors, the stators of both hydrostatic motors are the active part of the gear box, while rotors of both hydrostatic motors are the passive part of the system. Additionally, the hydrostatic system has both hydrostatic motors having the same rotary speed but moving in the opposite direction. While the first stator is connected to the engine, the common driven shaft of the both hydrostatic motors is connected to the external load on the output of the system.

14 Claims, 11 Drawing Sheets

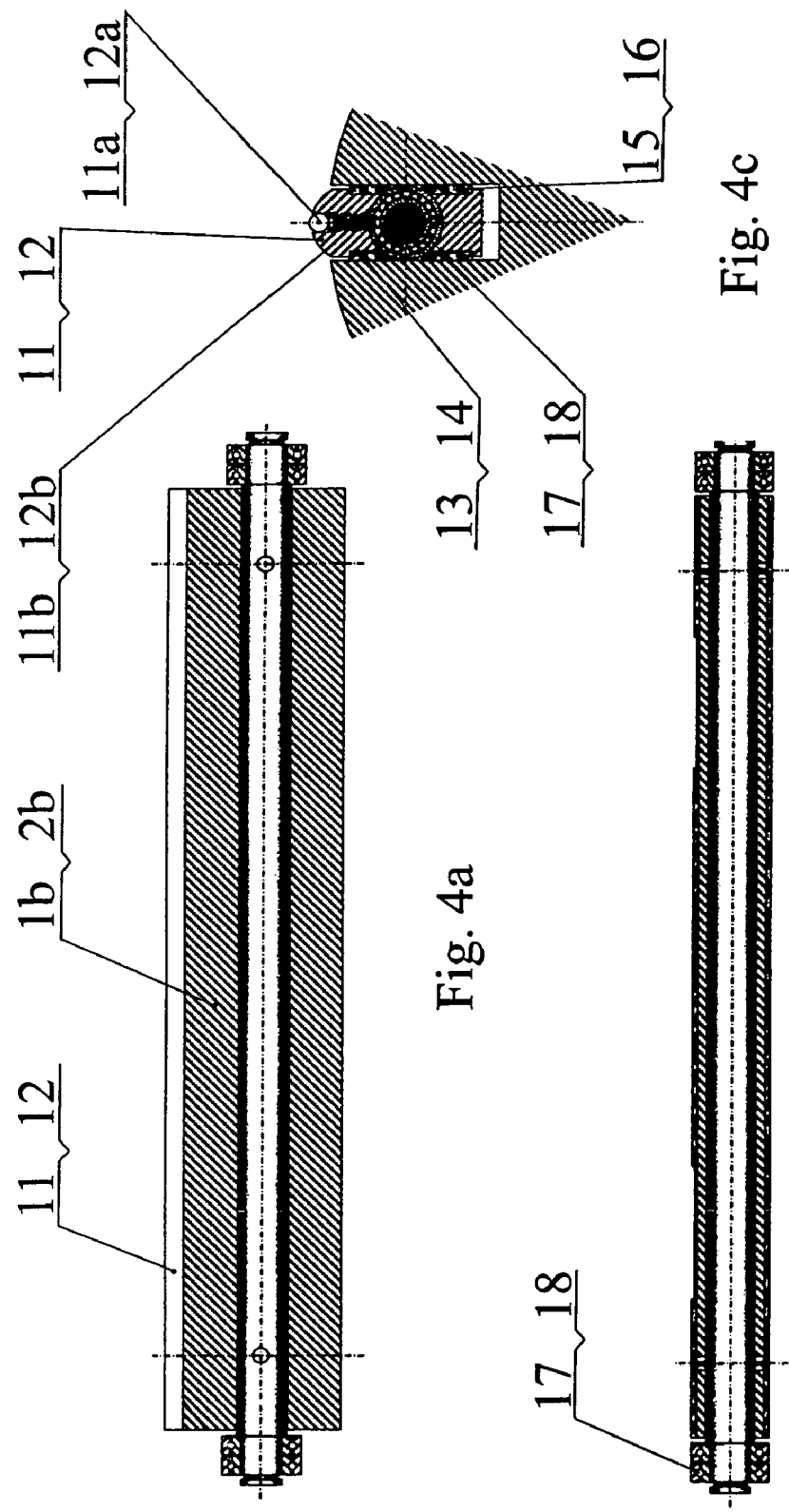

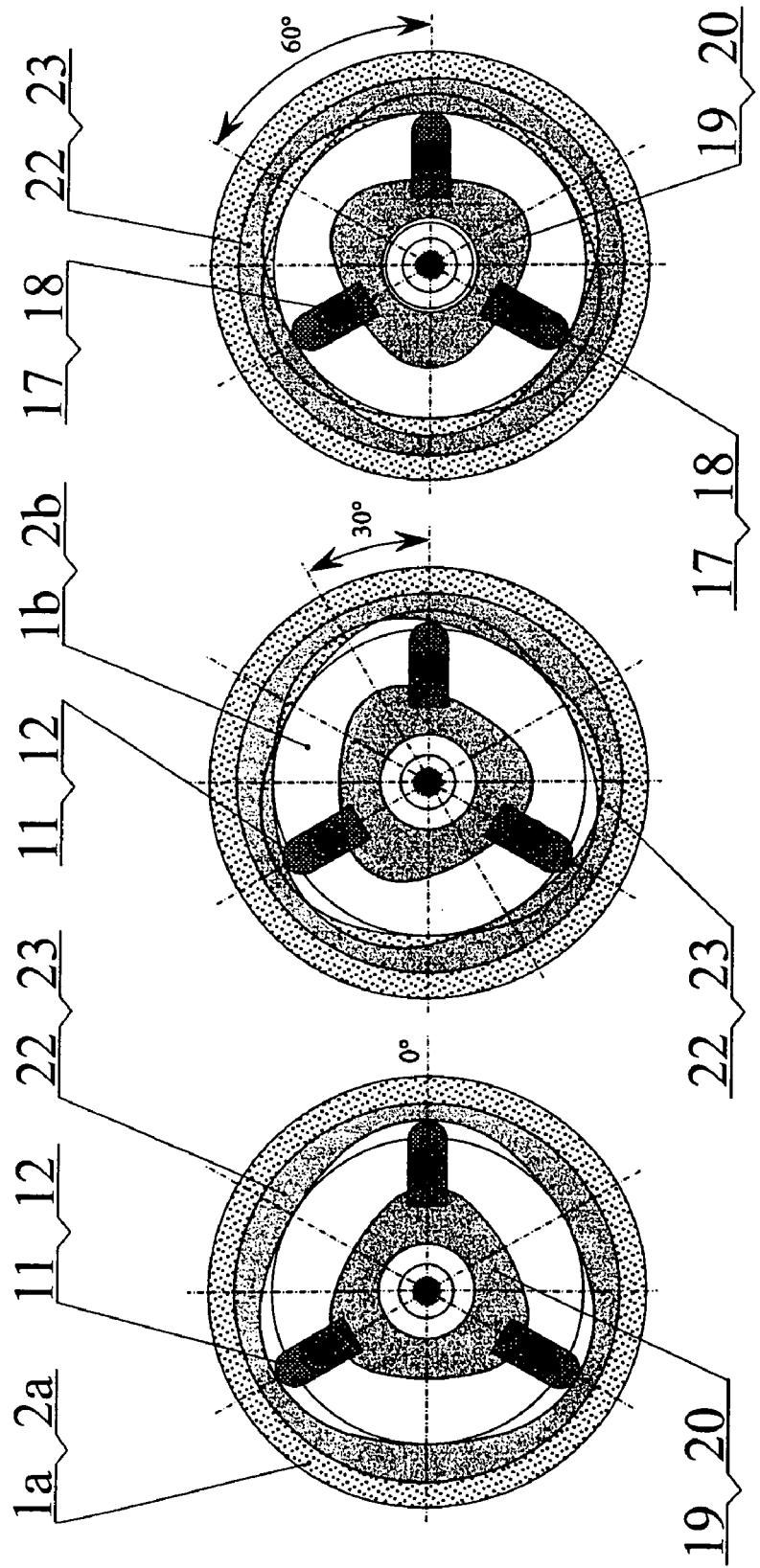

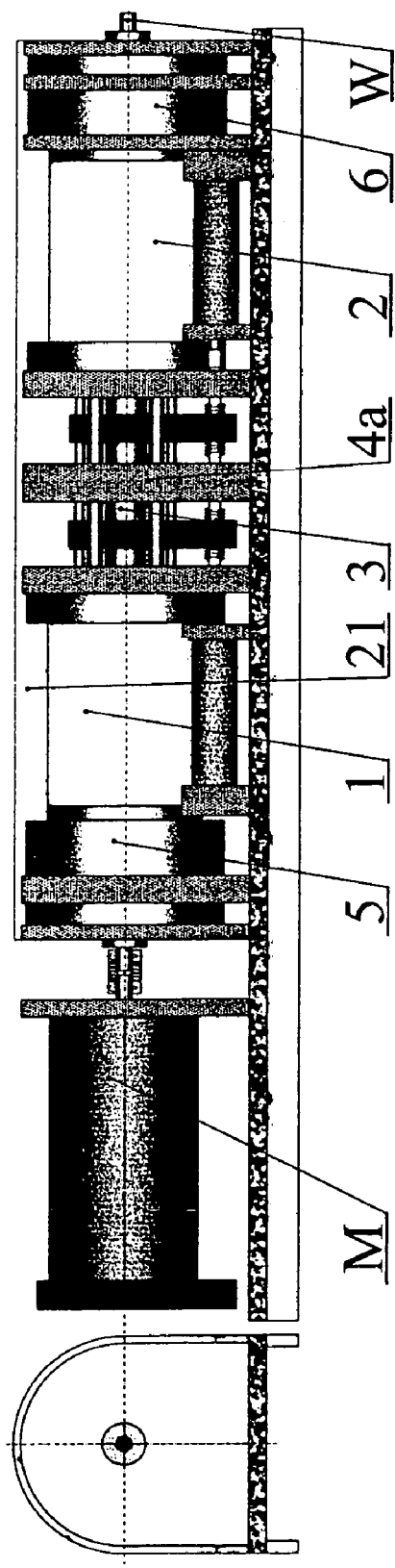
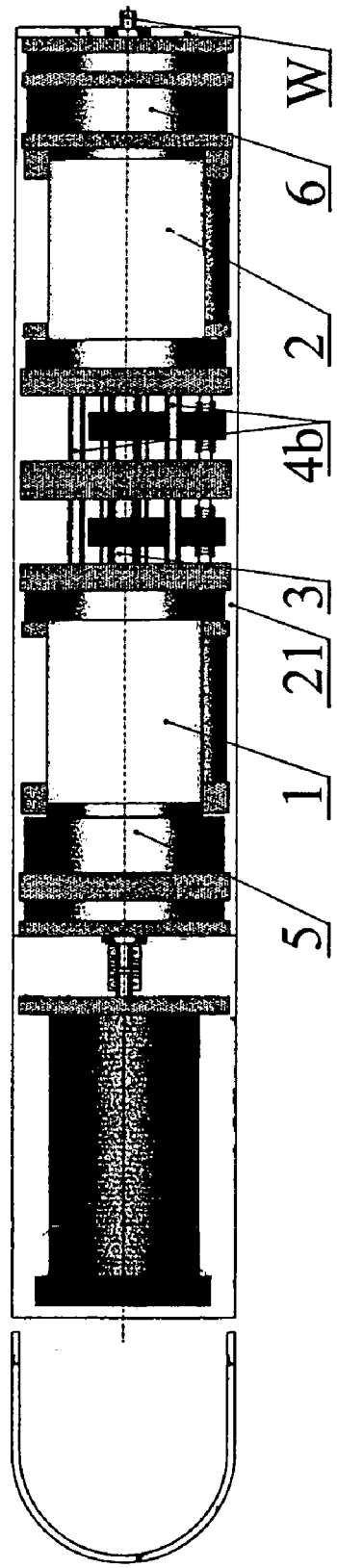
Fig. 9a
Fig. 9b

STEP-LESS HYDROSTATIC GEAR BOX FOR ROTARY MOVEMENT SLGB

CROSS REFERENCE TO RELATED APPLICATION

This application claims the benefit of Polish application no. P-385179, filed on May 14, 2008.

FIELD OF THE INVENTION

The present invention relates to a step-less hydrostatic gear box for a rotary movement transmission using two hydrostatic rotary motors or pumps with radial pistons.

BACKGROUND

The publication WO/1986/004306 presents the solution of the hydrostatic driving system of a slip-steered vehicle having a pair of hydraulic motors on each side of the vehicle, each of the hydraulic motors comprising two controllable hydraulic pumps, which are preferably mounted on the same driven shaft. Each of the hydraulic motors is arranged to drive at least one wheel. The invention is characterized in that the two hydraulic pumps are connected to the corresponding pairs of hydraulic motors via a closed system of pipes and valves, where the closed system permits switching the hydraulic motors from being connected in parallel to being connected in series.

The publication WO/1996/000865 presents the solution of an automatic, Inertial, Continuously Variable, Hydrostatic Transmission (C.V.T.) for motor vehicles, comprising a pair of reversible vane pump/motor (A, B) units connected in a closed circuit. The vane pump/motor (A, B) units are of the new "moving side" type with fixed eccentricity. The driving pump/motor unit (A) is driven by the engine and via a torque-sensitive inertial connection, which has a screw, a nut and a pressure spring, moves through the hydrostatic fluid to transfer the motion to the motor/pump (B) of the wheel. An alternative embodiment lacks the torque-sensitive connection, and the transmission ratio is varied continuously, but it is done manually without the use of a clutch.

The publication WO/1998/049470 presents a multi-range, synchronous shifting, hydromechanical transmission for application in an automotive drivetrain. The transmission receives split power inputs from the engine; one input being geared down to a lower speed for driving a continuously variable hydrostatic transmission unit, while the other input drives a counter shaft from which mechanical outputs are taken at different speed ratios. A planetary gear set, driven by the hydrostatic transmission unit, is shiftable to provide either a low continuously variable speed hydrostatic output, which is suitable for transmission operation in low output ranges, or a high continuously variable speed hydrostatic output, which is suitable for transmission operation in high output ranges. A gear system includes a plurality of gearsets selectively controlled by clutches and brakes to combine the hydrostatic and the mechanical outputs to produce four continuously variable forward ranges and one continuously variable reverse range.

The present invention resulted from the recognition that there is a need for a gear box that is easily adaptable to a hybrid solution for torque transmission fur use in a brushless electric motor. Such a gear box should have high efficiency as compared with the efficiency of gear boxes based on the gear wheel system and should have a simple construction with relatively small dimensions. Additionally, the gear box should not be sensitive to overloading and capable of protecting the drive system from damage.

SUMMARY OF THE INVENTION

The present invention is directed to a step-less hydrostatic gear box for the rotary movement transmission (SLGB—"Step Less Gear Box") which uses two hydrostatic rotary motors or pumps having radial pistons.

In accordance with the inventive hydrostatic system for step-less transmission for rotary movement, the two hydrostatic motors, i.e., pumps, with radial pistons are connected in a push-pull configuration. In this configuration, the stators of both hydrostatic motors or pumps are the active part of the system, i.e., driven by the engine or motor, while the rotors of the hydrostatic motors or pumps, which are mounted on the same driven shaft, are the passive part of the system, i.e., are driven by the stators. Additionally, the stators are arranged so that both stators turn at the same rotary speed but in the opposite direction.

The hydrostatic motors or pumps have one side connected with the engine or motor and the other side connected with an external load. The hydrostatic motors or pumps system also comprises a servo system, a system for oil distribution and a system for elimination of air or any other volatile substances from a working space of the installation.

Additionally, each hydrostatic motor or pump comprises special devices arranged to maintain a tightness between the upper part of the radial piston and the internal surface of the stator.

Furthermore, the system of oil distribution contains a series of valves inside each rotor, where the valves are connected to the servo system. A side of each radial piston is separated from the internal surface of the housing of the piston in such a way that the oil can freely flow between the bottom part of the housing and the working space, but the oil only flows on one side of the radial piston.

The top of each radial piston contacts the internal surface of the stator by using rods placed on the spring system in the upper part of each radial piston.

Additionally, the radial piston contacts the housing of the piston using special sliding plates arranged in a way to allow the radial piston to slide within the housing of the piston. Alternatively or in addition to the sliding plates, linear ball bearings can be used between the radial piston and housing of the piston. Separating plates can also be placed in the bottom of each housing of the radial pistons which slide inside the radial piston.

The oil distribution system contains on both sides of each rotor, special phase rings connected to the servo system which turn from 0° to 60°. The inside curvature of each phase ring corresponds to the inside curvature of the stator. The phase rings are connected permanently with the related guiding system of the radial pistons and are placed in the side covers of each stator.

One advantage of using the SLGB system is that it is possible to replace the low efficiency reciprocating engine with the internal combustion turbine. The SLGB gear box allows the turbine to work on the high and constant rotary speed and separates it mechanically from the external load. The resulting gear box consumes a lower amount of fuel than the reciprocating engine in the same power class and the turbine will not be damaged from unexpected changes in load.

Additionally, the resulting gear box allows the easy adaptation of the SLGB system to a number of hybrid systems. The SLGB gear box has a special configuration which allows it to be implemented in big hydrokinetic turbines in order to reduce vibrations as well as to protect the turbine against any damage from unexpected changes in the external load.

Furthermore, the resulting SLGB gear box allows the braking of the moving vehicle by only using the energy of the engine or if the engine is switched off, by using the SLGB system. This option allows the braking of the vehicle without generating any thermal energy inside the system.

An additional advantage is that full control of the rotary speed is performed in the hydrostatic part of the system at a relatively low rotary speed (in the low rotary speed part of the system). This special configuration of the hydrostatic gearbox allows the hydrostatic part of the system to always works at relatively low rotary speeds, even if the rotary speed of the rest of the whole system is high.

The resulting SLGB gear box also has the advantage that the current gear is always in optimal position, in that the system is "elastic". If the stored energy is higher or lower than the energy demanded by the load, the servo system is configured to immediately adapt the transmission ratio of the gear to the optimal conditions. This allows the stored energy to always be equal to the consumed energy. When the system is well adjusted, the effect of overloading or overheating does not occur, which results in lower energy consumption and automatically less pollution of the environment.

Another advantage of the new hydrostatic gear box is the possibility of continuously controlling and measuring the transmitted torque. This is performed by measuring the pressure inside the working space of both hydrostatic motors, where the pressure is relative to the transmitted torque.

An additional advantage of the new hydrostatic gear box is that the source of energy (i.e., the engine) is mechanically separated from the external load, i.e., the wheels of the vehicle. In other words, the wheels of the vehicle even when going down a very steep road does not mechanically engage the engine. This option guarantees a much higher driving security, even if the engine is switched off, since both hydrostatic motors or pumps are able to control completely the rotary speed of the vehicle's wheels.

Surprisingly, an unexpected result relating to energy generation during a braking process or during a violent acceleration of the vehicle also resulted from the inventive design of the gear box. It was found that thermal energy was not generated anywhere in the hydrostatic gear box system, so losses that lead to a lower efficiency and overheating are avoided.

Thermal energy is not generated since the whole system, besides the situation where both servo systems are in completely in the open position, works in so called locked position. Since the oil does not contain any volatile substances or air and following Newton's third principle of thermodynamics, i.e., each action is equivalent with the same reaction, there is no possibility of generating thermal energy, since the oil is an incompressible fluid.

This phenomenon can also be seen in a functioning physical model. The locked position is visible when the system is in a so called closed position. In any other position, it is necessary to analyze the time intervals where the time will be treated as an independent variable. When the time of each interval approaches zero (t→0), the number of these intervals will approach infinity (n→∞). In each of this intervals there is so called locked position where the third principle of Newton is fulfilled. In summary, the hydrostatic system does not generate any thermal energy since the oil cannot be deformed, i.e., compressed, in the perpendicular direction to the acting force.

BRIEF DESCRIPTION OF THE DRAWINGS

Examples of a step-less hydrostatic gear box for a rotary movement transmission according to different embodiments of the invention will now be explained in more detail with reference to the drawings, wherein:

FIGS. 4a, 4b, and 4c show the sub-assembly of the rotary piston inside the housing according to the first embodiment of the invention.

FIGS. 6a, 6b and 6c show the assemblage of elements used in the oil distribution system according to the second embodiment of the invention.

FIGS. 9a and 9b show the top and the side view of the whole system according to the first embodiment of the invention.

DETAILED DESCRIPTION OF VARIOUS EMBODIMENTS OF THE DISCLOSURE

Figure 1:
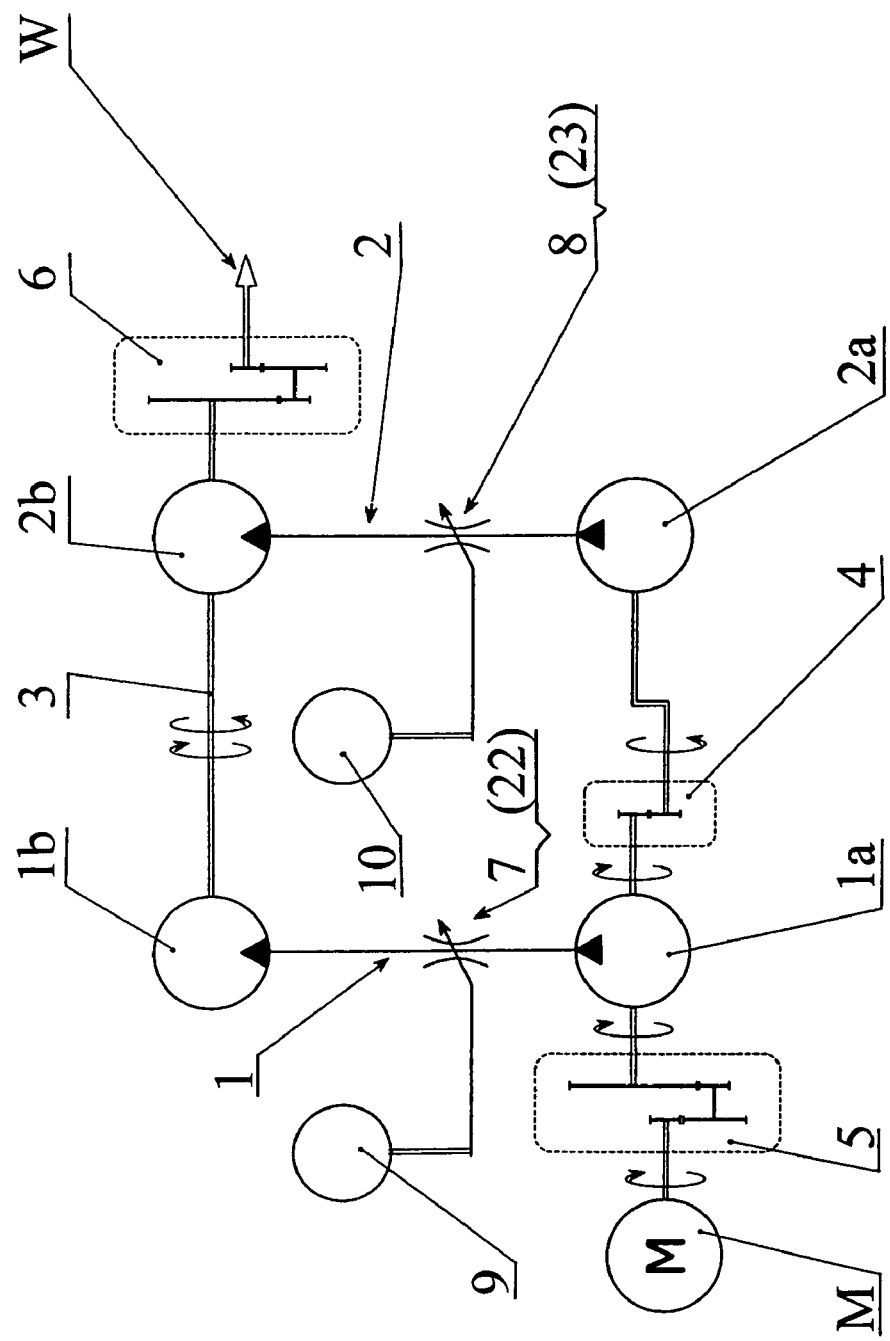
FIG. 1 shows a schematic view of the kinetic schema of the step less gear box.
Figure 2A:
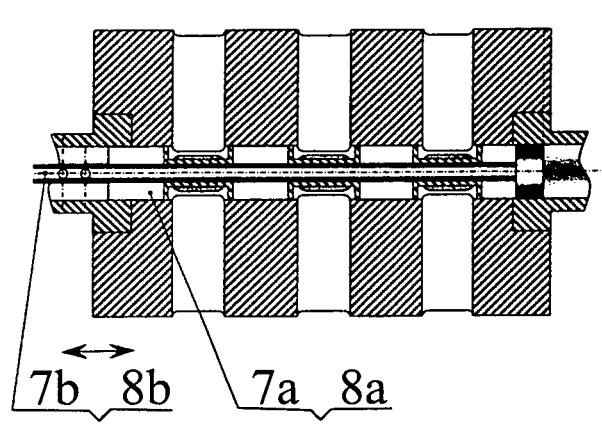
FIGS. 2a and 2b show the assemblage of elements used in the oil distribution system according to a first embodiment of the invention.
Figure 2B:
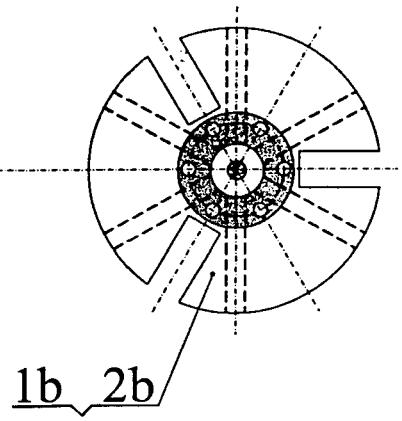
Figure 3A:
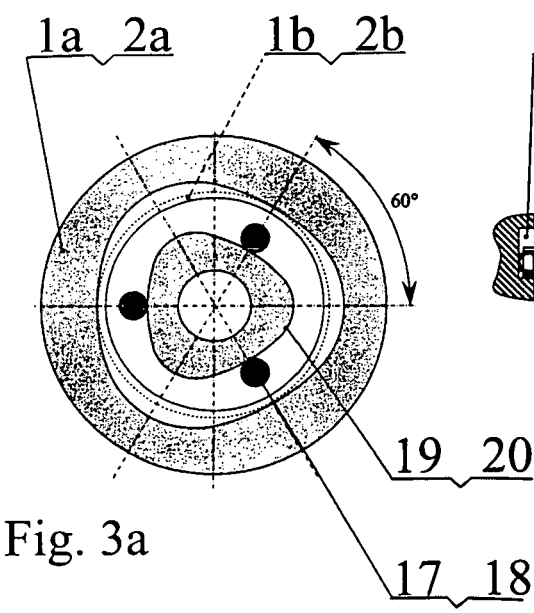
FIGS. 3a and 3b show the assemblage of elements used in the oil distribution system according to a second embodiment of the invention.
Figure 3B:
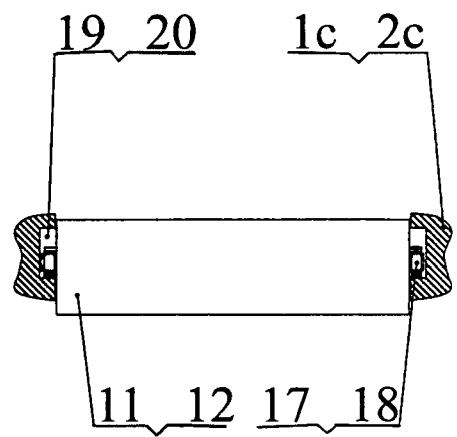
Figure 5:
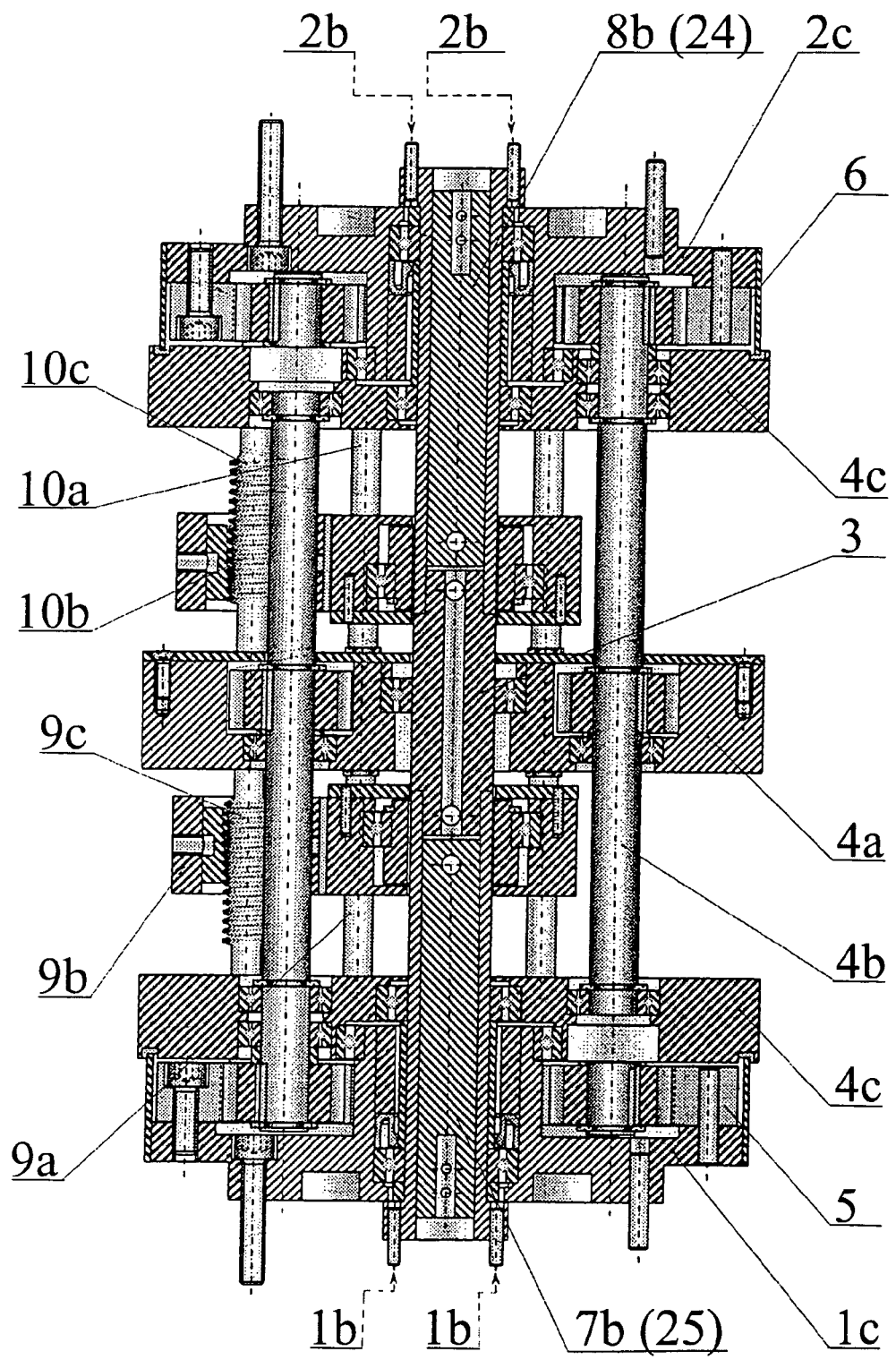
FIG. 5 shows the longitudinal profile of the push-pull connection of both hydrostatic motors.
Figure 5A:
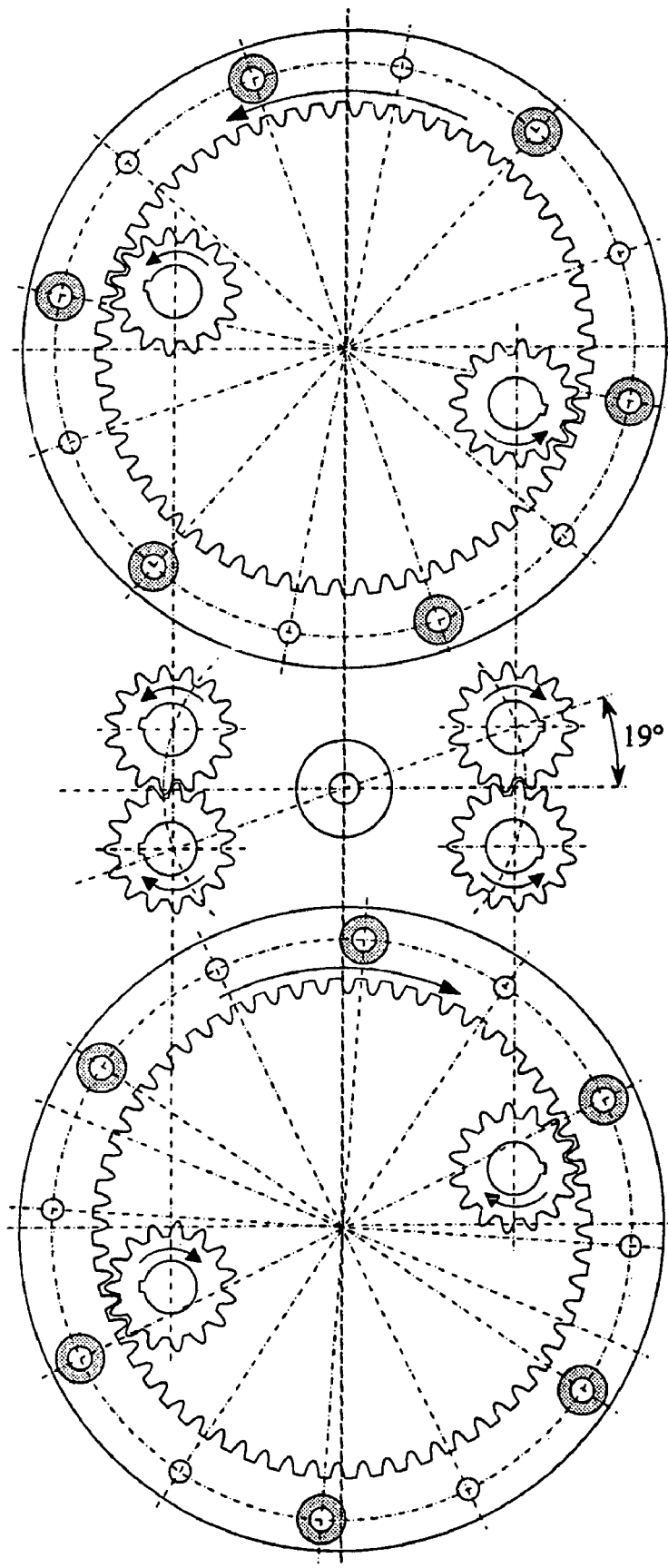
FIG. 5a shows the configuration of the gear wheels of the planetary system placed in the push-pull connection.
Figure 7:
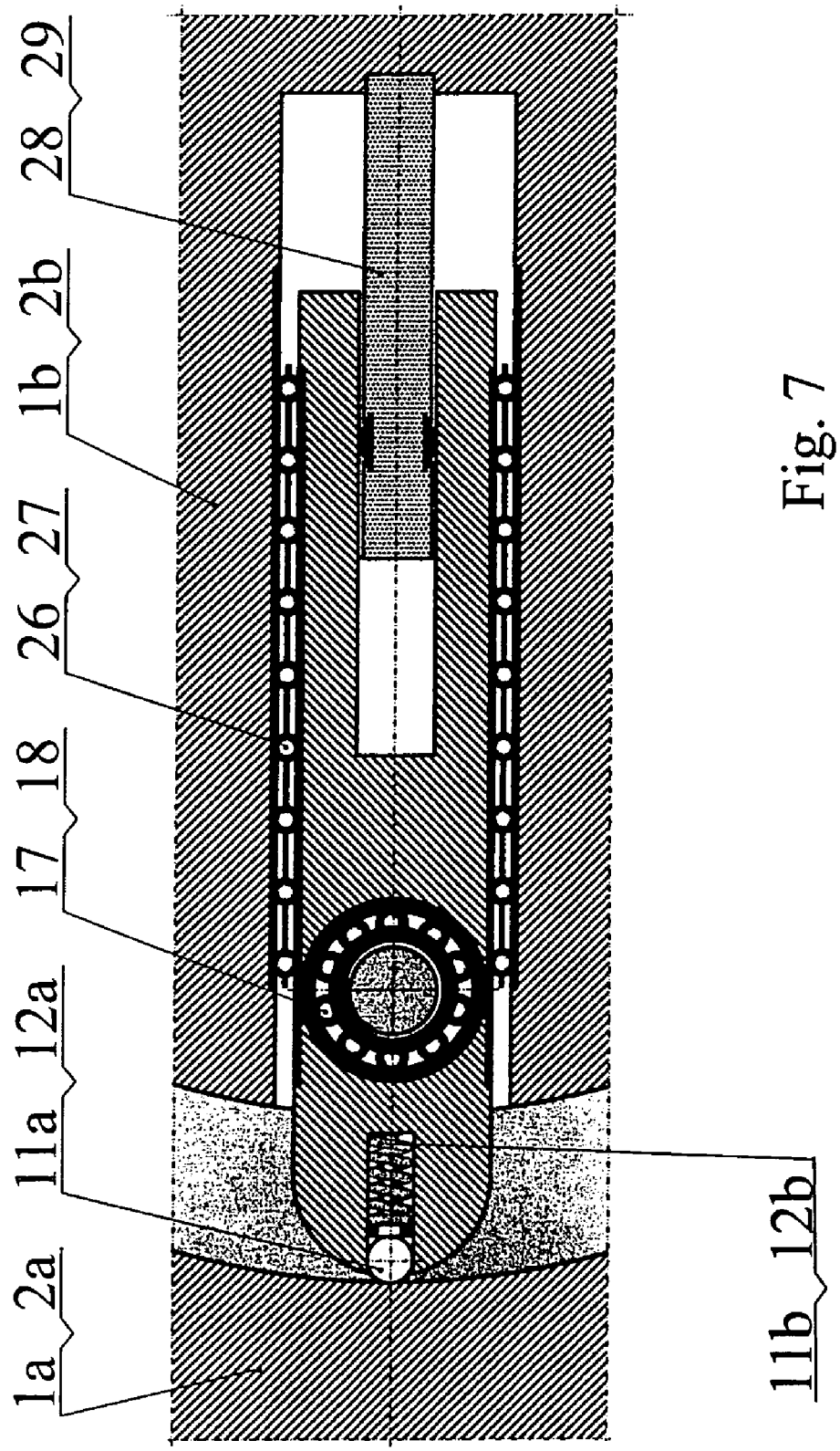
FIG. 7 shows the sub-assembly of the rotary piston inside the housing according to the second embodiment of the invention.
Figures 8A, 8B:
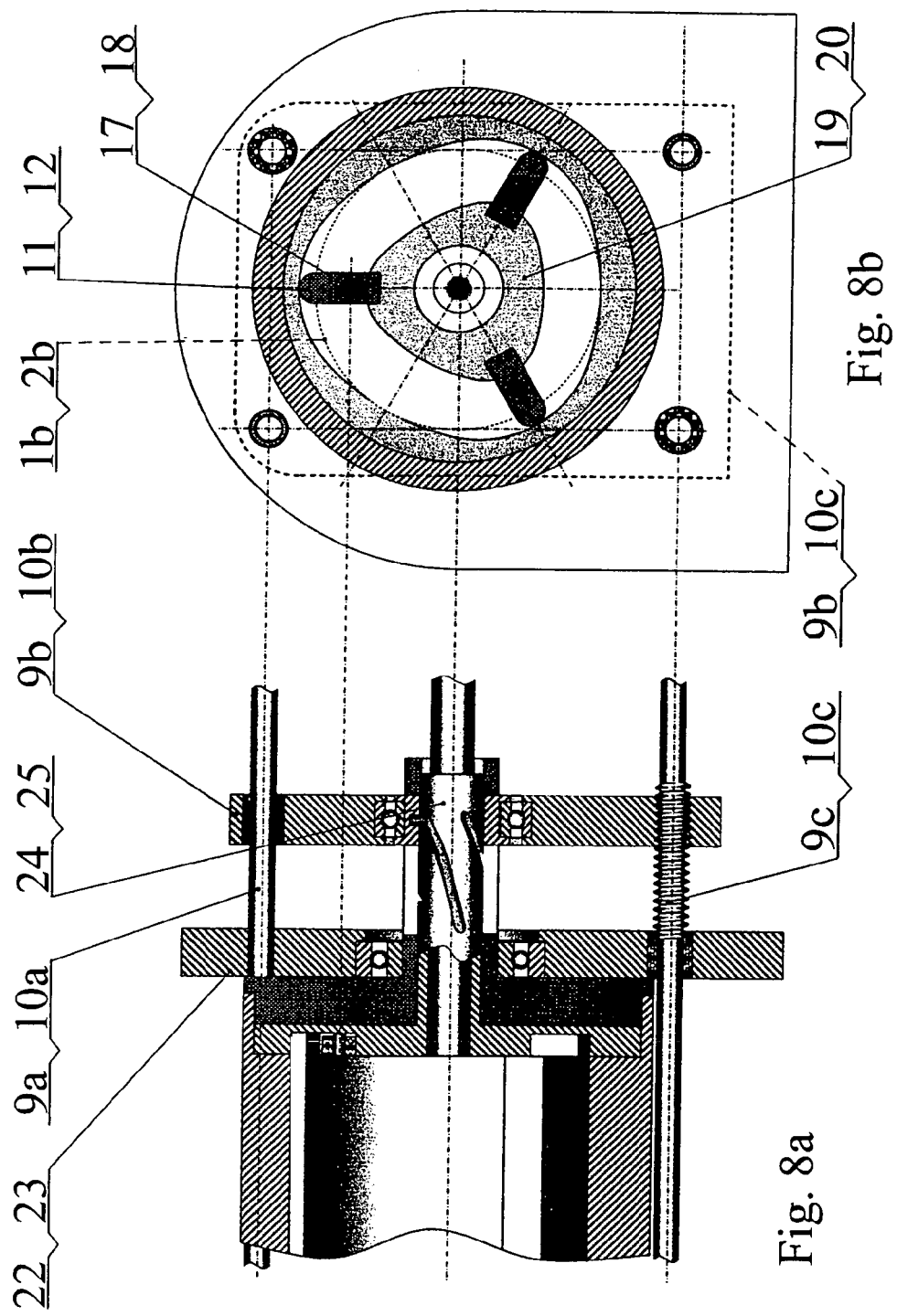
FIGS. 8a and 8b show the end side of one of the hydrostatic motors according to the second embodiment.
Figure 10:
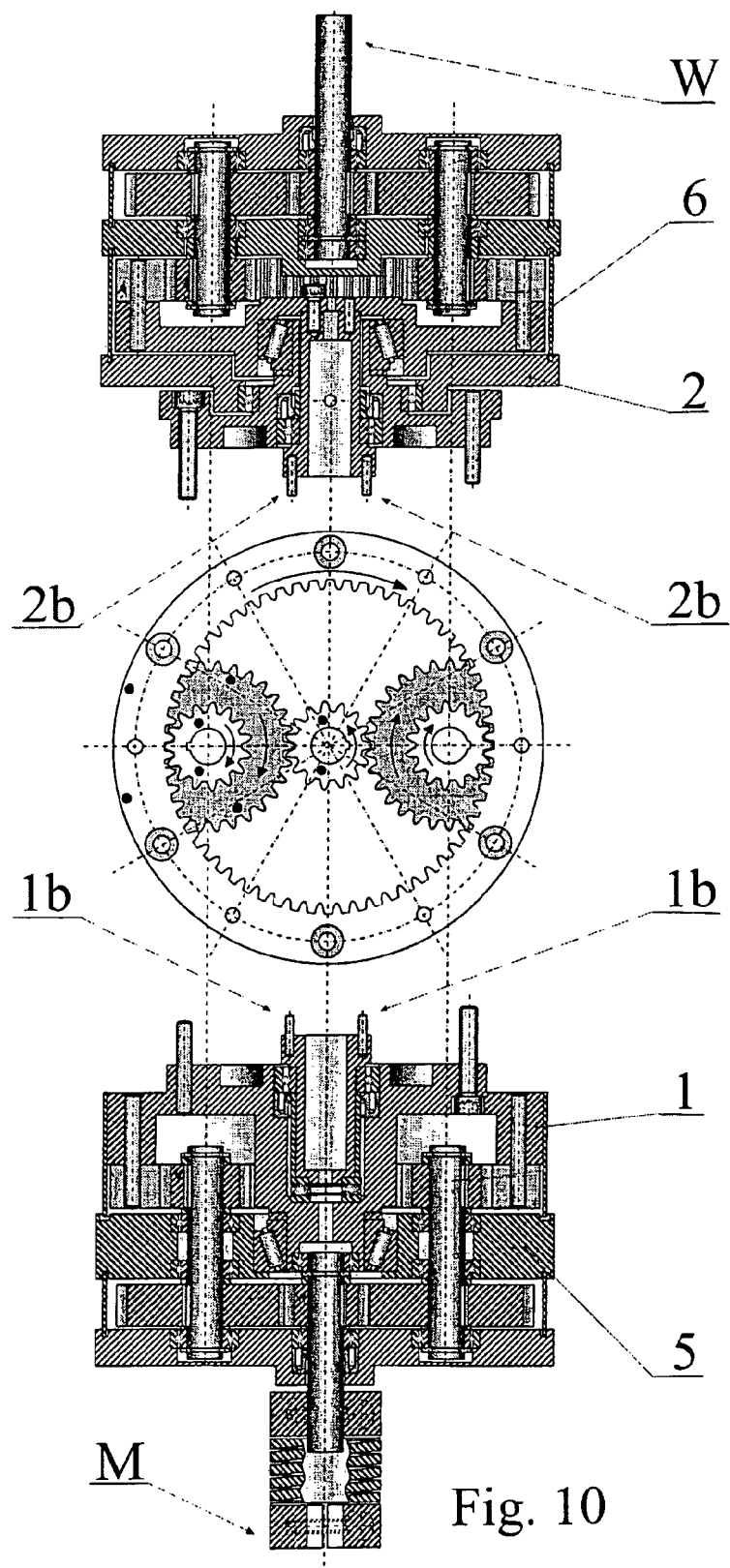
FIG. 10 shows the configuration of the elements on the input and the output of the system, where the configuration is the same in both embodiments.
Figure 11:
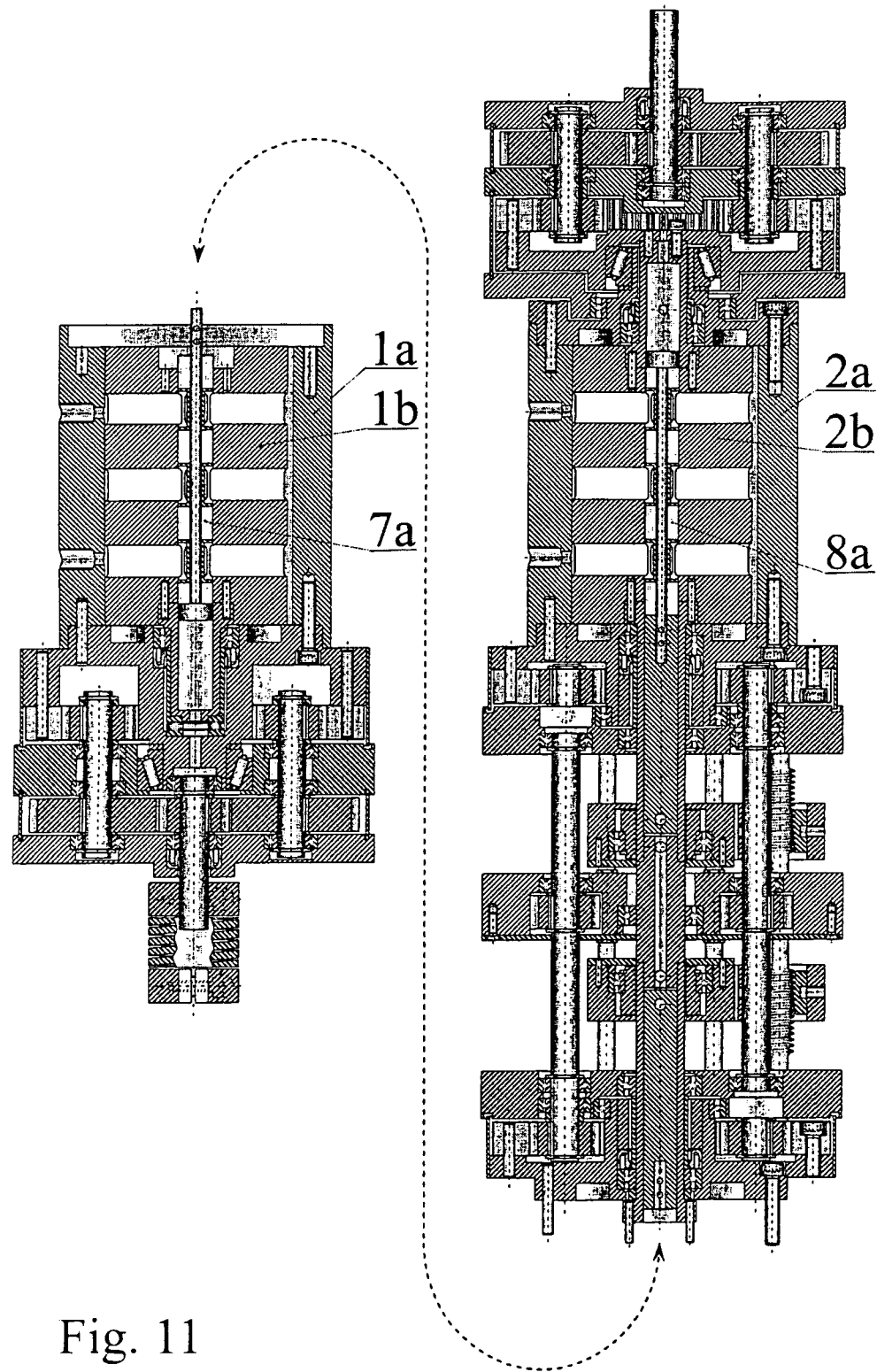
FIG. 11 shows the longitudinal profile of the whole system according to the first embodiment of the invention.

Two embodiments of the invention are shown in the drawings. The first embodiment relates to using a valve control system and the second embodiment uses a phase control system for controlling the hydrostatic pressure. FIG. 1 shows the kinetic schema of the step less gear box. The kinetic schema is the same for both versions of the invention.

Embodiment 1

The hydrostatic step less system for rotary movement transmission according to the first embodiment of the invention contains two hydrostatic motors 1 and 2 connected in a push-pull configuration connected to the engine M on the input and to the external load W on the output, a system of oil distribution and a system for elimination of air and volatile substances from the working space. In this push-pull configuration of both hydrostatic motors 1 and 2, the stators 1a and 2a are the active parts of the gear box, while the rotors 1b and 2b, which are mounted on the same driven shaft 3, are the passive parts of the gear box.

In this embodiment, the connection 4 contains the planetary gear box 4a having a transmission ratio of 1:-1. In other words, shafts 4b are placed in a special housing 4c to allow the stators of both hydrostatic motors to have the same rotary speed but rotate in the opposite direction. The first stator 1a is connected to the engine M, while the common shaft of the rotors 1b and 2b of both hydrostatic motors 1 and 2 is connected to the external load W on the output of the system. This configuration of the hydrostatic motors allows the control of the expected top value of the rotary speed, i.e., it protects against over speeding.

Additionally, if the new system is installed in the vehicle, the energy of the engine M can be used to brake the vehicle. Moreover, the features of the new gear box are completely symmetric so that all the functions can be seen as being aligned in one line. This gives a smoother transmission of the rotary movement between the engine and the load so that all elements of the system can have a longer life, i.e., decrease in wear.

The hydrostatic pumps 1 and 2 having radial pistons act as hydrostatic motors. The stator 1a is connected to the engine M through the planetary gear box 5 which reduces the rotary speed at a transmission ratio of 8:1. The rotor 2b is connected with the external load through the planetary gear box 6 which increases the rotary speed at a transmission ratio of 1:8. By using the planetary gear box 5 and planetary gear box 6 to reduce and increase the rotary speed, the hydrostatic part of the system can work at relatively low rotary speeds.

The oil distribution system of both hydrostatic motors 1 and 2 have valve systems 7 and 8 located inside of each rotor 1b and 2b. The valves 7a and 8a are connected to servo systems 9 and 10 through shafts 7b and 8b. The servo systems 9 and 10 are used to determine and control the position of the valves 7a and 8a. The servo systems 9 and 10 contain the blocks 9b and 10b which slide on four sliding shafts 9a and 10a and are connected through the trapezoid screws 9c and 10c with the servomotors 9d and 10d. In order to change the position of the valves 7a and 8a the shafts 7b and 8b perform a linear movement inside of each turning rotor 1b and 2b inside a central shaft.

The valve's system 7 and 8 are constructed so that the distance between two neighboring working spaces is limited to the minimum. This solution eliminates the risk of turbulent oil flow and at the same time guarantees high efficiency of the gear box.

The radial pistons 11 and 12 are placed in the housings of rotors 1b and 2b in such a way that the flat parts of each piston slide on the side surface of the housing. The contact between the side of the piston and the side of the housing is performed using sliding plates 13, 14, 15 and 16. In the bigger units the sliding plates can be replaced with the linear ball bearings 26 and 27. In this case on the bottom of each housing 1b and 2b there are installed special separating plates 28 and 29 which slide inside radial pistons 11 and 12. These plates reduce the risk of oil flowing between two neighboring working spaces through the radial piston, which would lead to a decrease in efficiency. In order to avoid jamming of the radial piston 11 and 12 which uses sliding plates 13, 14, 15 and 16, with the housings 1b and 2b, the flat part of the radial piston is partially separated from the side surface of the housing 1b and 2b in such a way that the oil can move between the working space and the bottom of each responding housings 1b and 2b, but only on one side of each radial piston 11 and 12. This eliminates the possibility of generation of volatile substances inside the system. Without this solution during movement of the radial piston 11 and 12 down in the housing, the oil in the bottom part of the housing would be pressurized. The pressurization of the oil would lead to the situation where the temperature of the oil in the bottom part of the housing will increase which would generate some volatile substances. Additionally, during the movement of the radial piston away from the bottom of the housing, a vacuum would be created in the bottom part of each housing which would also lead to the generation of volatile substances.

The radial pistons 11 and 12 contact the inside surface of each stator 1a and 2a using rods 11a and 12a which are attached to the top of each of the radial pistons 11 and 12. Additionally, a spring system 11b and 12b is used that is coupled between the rods and the top of each radial piston which allows the radial movement of the rods in the interval between about ±0.1 mm. On both longitudinal ends of each radial piston 11 and 12 ball bearings 17 and 18 are used to turn on the surface of the piston guiding system 19 and 20. The piston guiding system 19 and 20 is connected permanently with the side cover 1c and 2c of each stator 1a and 2a. The minimal position of each radial piston 11 and 12, i.e., where the radial pistons 11 and 12 are located near the bottom of the housing 1b and 2b, is determined in-part by the curvature of the piston guiding system 19 and 20 the ball bearings 17 and 18 on the longitudinal ends of the radial pistons 11 and 12 are turning. The maximum position of each radial piston 11 and 12, i.e., where the radial pistons 11 and 12 are farthest away from the bottom of the housing 1b and 2b is determined in-part by the curvature of the inside surface of the stator 1a and 2a.

The hydrostatic pumps 1 and 2 with the radial pistons 11 and 12 work as hydrostatic motors in a push-pull configuration. If both hydrostatic motors 1 and 2 are in the completely open position, where the oil passes through the openings in the rotors 1b and 2b, no forces act on the radial pistons 11 and 12 so that the rotary motion of the engine M is not transmitted to the output W of the gear box. If the hydrostatic motor 1 has the valve 7a in a completely closed position so that the oil acts on the radial piston 11 and the hydrostatic motor 2 has the valve 8a in a completely open position so that the oil passes through the openings in the rotor 2b and does not act on the radial piston 12, the rotary movement of the engine M is directly transmitted to the output W of the gear box. If the hydrostatic motor 1 has the valve 7a in a completely open position in which the oil passes through the openings in rotor 1b and does not act on the radial piston 11 and the hydrostatic motor 2 has valve 8a in a completely closed position so that the oil acts on the radial piston 12, the rotary movement of the engine M is also directly transmitted to the output W of the gear box, but in the reverse direction of the rotary movement of the engine M. If both hydrostatic motors are in a symmetrically partially open position, the system acts as a brake, where the more closed the valves 7a and 8a are, the more braking force is created. The situation where both hydrostatic motors 1 and 2 have the valves 7a and 8a in a completely closed position is not recommended, when the engine is running. Such a situation is only recommended when the vehicle is parked, where the closed valves 7a and 8a act as a parking brake. This option has an advantage in cold countries during winter time. In the prior art devices, when the temperature is very low and the parking brakes are used, there is the risk that the braking blocks will freeze to the disc, making it impossible to start the vehicle.

All the other non symmetric and partially open positions of the valve positions in both hydrostatic motors 1 and 2 results in different rotary speeds for the output W of the gear box compared to the rotary speed of the engine M. If the vehicle with implemented SLGB gear box moves forward, the hydrostatic motor 1 transmits the torque (it works as an engine), while the hydrostatic motor 2 provides the necessary opposite torque in order to avoid non controlled over speed of the output of the system. If the vehicle moves backward, the hydrostatic motor 2 takes over the functions of the hydrostatic motor 1 and the hydrostatic motor 1 takes over the functions of the hydrostatic motor 2.

The position of the valves 7 and 8 are controlled by the electronic system which continuously measures the rotary speed of the engine M, the expected rotary speed on the output W of the gear box, the external load and the transmitted torque. The rotary speed of the hydrostatic part of the gear box is eight times lower than the rotary speed of the engine M, respectively, the rotary speed on the output W is eight times higher than the rotary speed of the gear box. The ratio of the gear can be higher or lower than eight. It depends of the size of the gear box, the power class of the engine and the maximum rotary speed limit of the engine. This configuration with decreasing and increasing rotary speed makes the whole control of the gear box more efficient and easier.

Moreover, the hydrostatic part of the gear box is submerged in the vessel 21 which is completely filled up with oil. This allows the elimination of air and other volatile substances from the hydrostatic part of the system. Since the hydrostatic part of the system is hermetically sealed, there is no risk that the system will suck in air from the outside. Instead, the hydrostatic system can only suck the oil from vessel 21. Additionally, since the working space in the hydrostatic part does not contain any air or other volatile substances, there is no generation of thermal energy and the gear box does not lose efficiency.

Version 2

The hydrostatic step less system for the rotary movement transmission according to the first version of the invention contains two hydrostatic motors 1 and 2 connected in a push-pull configuration and are connected to the engine M on the input and to the external load W on the output, the system of oil distribution, and the system for elimination of air and volatile substances from the working space. In this push-pull configuration of both hydrostatic motors 1 and 2 the stators 1a and 2a are the active parts of the gear box, while the rotors 1b and 2b which are mounted on one and the same driven shaft 3 are the passive parts of the gear box. The stators of the hydrostatic motors 1 and 2 are connected by the connection 4 containing the planetary gear box 4a with the transmission ratio 1:-1 and shafts 4b placed in a special housing 4c so that the stators of both hydrostatic motors have the same rotary speed but rotate in the opposite direction. The first stator 1a is connected to the engine M. The common shaft of the rotors 1b and 2b of both hydrostatic motors 1 and 2 is connected to the external load W on the output of the system. This configuration of both hydrostatic motors guarantees efficacious control of the high value of the rotary speed, i.e., it protects against over speeding.

If the new system is installed in the vehicle, the driver can brake it by using only the energy of the engine M. The system of the new gear box is completely symmetric and all the functions are placed in one line. This gives a smoother transmission of the rotary movement of the engine to the external load all elements of the system can have a longer life, i.e., decrease in wear.

The hydrostatic pumps 1 and 2 with radial pistons are working as hydrostatic motors. The stator 1a is connected to the engine M through the planetary gear box 5 which reduces the rotary speed at a transmission ratio of 8:1. The rotor 2b is connected with the external load through the planetary gear box 6 which increases the rotary speed at a transmission ratio of 1:8. The use of a reducing planetary gear box 5 and increasing planetary gear box 6 guarantees that the hydrostatic part of the system works always on the relatively low rotary speed. This configuration with decreasing and increasing rotary speed makes the control of the gear box more efficient and easier.

In this embodiment, the oil distribution system of both hydrostatic motors 1 and 2 contains on both sides of each rotor 1b and 2b phase rings 22 and 23 which turn from 0° to 60°. The inside curvature of each phase ring corresponds to the inside curvature of each stator 1a and 2a. If the phase rings 22 and 23 are in a 0° position, the oil system is in a completely closed position in which the oil acts on the radial pistons 11 and 12. If the phase ring 22 and 23 is in a position between $0°<\varphi<60°$, the oil system is in a partially open position. In this embodiment, the function of valves is taken by the opening between the top of the pistons 11 and 12 and the inside surface of the stator 1a and 2a. The size of the opening is controlled by the servo system, which controls the positioning of the phase rings 22 and 23. In the partially open position the oil passes through the opening between the top of the radial pistons 11 and 12 and the inside surface of the stator 1a and 2a to the neighboring working space while the rest of the oil acts on the radial pistons 11 and 12 to rotate the radial piston. If the phase ring 22 and 23 is in a position at 60°, the oil system is in a completely open position. In this position, all of the radial pistons are hidden inside the housings in rotors 1b and 2b and the oil passes from one to the other neighboring working space. In this position the rotary movement of the stators 1a and 2a has no influence on the rotary movement of the rotors 1b and 2b. In order to have the position of both phase ring 22 and 23 of each hydrostatic motor in the same phase, both of them are permanently connected to each other.

The phase rings are also connected permanently with the piston guiding system 19 and 20. The phase of the phase ring 22 and 23 are always equal with the phase of the curvature of the respective piston guiding system 19 and 20. Both phase rings are placed inside the stators 1a and 2a. The position of the phase rings 22 and 23 are controlled by servo systems 9 and 10 which determine the position of the respective phase shafts 24 and 25. The phase shafts 24 and 25 contain six rows that correspond to a worm screw are on both sides of the stators 1a and 2a. The servo system 9 and 10 contains sliding blocks 9b and 10b which are sliding on the sliding shafts 9a and 10a. The sliding blocks 9b and 10b belonging to the same hydrostatic motor 1 and 2, respectively, are connected to the servo motors 9d and 10d through the trapezoid screws 9c and 10c. The linear movement of the phase shafts 24 and 25 inside the rotating main shaft is performed by the contact with the sliding blocks 9b and 10b. In this embodiment having the phase rings 22 and 23, the oil passes directly from one to the other neighboring working space, so that even if the rotary speed is very high there is no risk of turbulent oil flow and in the same time it guarantees the high efficiency of the gear box.

Additionally, the radial pistons 11 and 12 are placed in the housings of rotors 1b and 2b in such a way that the flat parts of each piston slide along the side surface of the housing. The contact between the side of the piston and the side of the housing is performed through the sliding plates 13, 14, 15 and 16. In the bigger units the sliding plates can be replaced by the linear ball bearings 26 and 27. In this case on the bottom of each housing 1b and 2b there are installed special separating plates 28 and 29 which slide inside the radial pistons 11 and 12. These plates reduce the risk of the non-controlled flow of oil between two neighboring working spaces.

Moreover, in order to avoid the jamming of the radial piston 11 and 12 with the housings 1b and 2b, the flat part of the radial piston is partially separated from the side surface of the housing 1b and 2b in such a way that the oil can move between the working space and the bottom of each responding housings 1b and 2b, but only on one side of each radial piston 11 and 12. This solution eliminates the possibility of generation of volatile substances inside the system. Without this solution during movement of the radial piston 11 and 12 down in the housing, the oil in the bottom part of the housing would be pressurized. The pressurization of the oil would lead to the situation where the temperature of the oil in the bottom part of the housing will increase which would generate some volatile substances. Additionally, during the movement of the radial piston away from the bottom of the housing, a vacuum would be created in the bottom part of each housing which would also lead to the generation of volatile substances.

The radial pistons 11 and 12 contact the inside surface of each stator 1a and 2a using rods 11a and 12a which are attached to the top of each of the radial pistons 11 and 12. Additionally, a spring system 11b and 12b is used that is coupled between the rods and the top of each radial piston which allows the radial movement of the rods in the interval between about ±0.1 mm. On both longitudinal ends of each radial piston 11 and 12 ball bearings 17 and 18 are used to turn on the surface of the piston guiding system 19 and 20. The piston guiding system 19 and 20 is connected permanently with the side cover 1c and 2c of each stator 1a and 2a. The minimal position of each radial piston 11 and 12, i.e., where the radial pistons 11 and 12 are located near the bottom of the housing 1b and 2b, is determined in-part by the curvature of the piston guiding system 19 and 20 the ball bearings 17 and 18 on the longitudinal ends of the radial pistons 11 and 12 are turning. The maximum position of each radial piston 11 and 12, i.e., where the radial pistons 11 and 12 are farthest away from the bottom of the housing 1b and 2b is determined in-part by the curvature of the inside surface of the stator 1a and 2a. The position of the phase rings 22 and 23 is determined by the electronic system, which continuously controls the rotary speed of the engine M, the expected rotary speed on the output W of the gear box, the external load and the transmitted torque.

The hydrostatic part of the gear box is submerged in the vessel 21 which is completely filled up with oil. This eliminates air and other volatile substances from the hydrostatic part of the system. Since the hydrostatic part of the system is hermetically sealed, there is no risk that the system will suck in air from the outside and only sucks the oil from vessel 21. If the working space in the hydrostatic part does not contain any air or other volatile substances, there is no generation of thermal energy and the gear box does not lose its efficiency.

What is claimed is:

1. A step-less hydrostatic gear box for a rotary movement transmission comprising:
   at least a first and second hydrostatic pump, each of said hydrostatic pumps comprising a stator and a rotor, said rotor comprising an axially extending housing receiving at least one radial piston having a bottom portion and a top portion, and wherein said stator comprises an inner surface that contacts the top portion of the at least one radial piston to form at least one working space;
   an input shaft having a first end coupled to an input drive motor and a second end coupled to the stator of the first hydrostatic pump,
   said stator of the first hydrostatic pump being connected to the stator of the second hydrostatic pump in a manner so that the stators are driven at a same rotary speed but in opposite rotary directions;
   an output shaft having a first end coupled to an external load and a second end;
   a drive shaft coupled to the rotors of the at least first and second hydrostatic pumps, said second end of the output shaft being coupled to the drive shaft;
   an oil distribution system arranged to distribute oil to the at least two hydrostatic pumps so that said oil fills the at least one working space; and
   at least one servo system configured to control the distribution of oil from the oil distribution system,
   wherein the stator and rotor of each of the at least two hydrostatic pumps are arranged so that when oil is distributed to the at least one working space, the rotation of the stators by the input shaft creates hydrostatic pressure driving said rotors in rotation.

2. The step-less hydrostatic gear box according to claim 1, wherein said stator of the first hydrostatic pump connected to the stator of the second hydrostatic pump comprises at least two connection shafts connected to the stators of the first and second hydrostatic pumps and a planetary gear connected to the at least two connection shafts that enables the stators of the at least two hydrostatic pumps to rotate at the same rotary speed but in opposite directions.

3. The step-less hydrostatic gear box according to claim 1, wherein the oil distribution system comprises at least one oil valve inside each rotor of the first and second hydrostatic pumps that is controllably moveable between closed, partially open, and open positions.

4. The step-less hydrostatic gear box according to claim 3, wherein the at least one servo system is configured to control the movement of the at least one oil valve, so that when the oil valve is in the open position, the oil is not distributed into the working space to varying degrees to create variable hydrostatic pressure, and when the oil valve is in the closed position, the oil is distributed into the working space in a way such that full hydrostatic pressure is created.

5. The step-less hydrostatic gear box according to claim 3, wherein the bottom portion of the at least one radial piston comprises at least one flat portion, said flat portion arranged in the housing of said rotor in a way such that oil flows freely between a bottom of the housing on only one side of the at least one radial piston.

6. The step-less hydrostatic gear box according to claim 5, further comprising at least one sliding plate coupled between the at least one flat portion of the at least one radial piston and the housing of said rotor so that the bottom portion is slidable within said housing.

7. The step-less hydrostatic gear box according to claim 5, further comprising linear ball bearings coupled to the at least one flat portion of the radial piston so that the bottom portion is slidable on the ball bearings within said housing of the rotor.

8. The step-less hydrostatic gear box according to claim 3, wherein said top portion of said radial pistons comprises a spring system, and a piston rod connected to said spring system and contacting an inner surface of the stator.

9. The step-less hydrostatic gear box according to claim 1, wherein the oil distribution system further comprises phase rings that are permanently connected with a piston guiding system coupled to the stator, said phase rings configured to be rotated from 0 to 60 degrees, and having an inside curvature corresponding to a curvature of an inner surface of the stator.

10. The step-less hydrostatic gear box according to claim 9, wherein the bottom portion of the at least one radial piston comprises at least one flat portion, said flat portion arranged in the housing of said rotor in a way such that oil flows freely between a bottom of the housing on only one side of the at least one radial piston.

11. The step-less hydrostatic gear box according to claim 9, wherein said top portion of said radial pistons comprises a spring system, and a piston rod connected to said spring system and contacting an inner surface of the stator.

12. The step-less hydrostatic gear box according to claim 9, further comprising at least one sliding plate coupled between the at least one flat portion of the at least one radial piston and the housing of said rotor so that the bottom portion is slidable within said housing.

13. The step-less hydrostatic gear box according to claim 9, further comprising linear ball bearings coupled to the at least one flat portion of the radial piston so that the bottom portion is slidable on the ball bearings within said housing of the rotor.

14. The step-less hydrostatic gear box according to claim 9, further comprising at least two neighboring working spaces, wherein a distance between said at least two neighboring working spaces is arranged to be at a minimum distance that corresponds to the thickness of the radial piston.

* * * * *